Aug. 13, 1935.  H. L. HALBACH  2,011,482
GLASS TANK
Filed Nov. 23, 1933  3 Sheets-Sheet 3
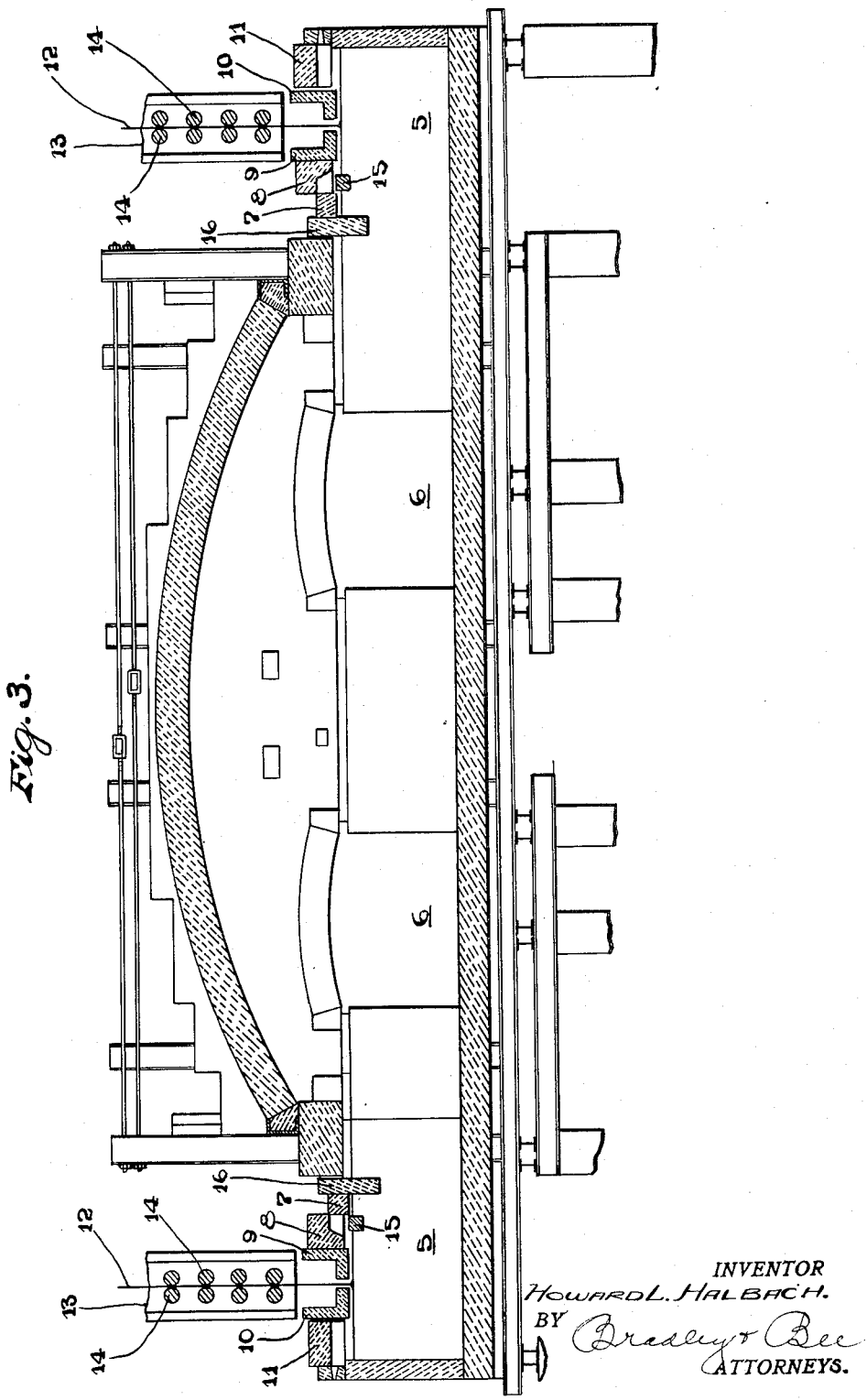
INVENTOR
HOWARD L. HALBACH.
BY
ATTORNEYS.

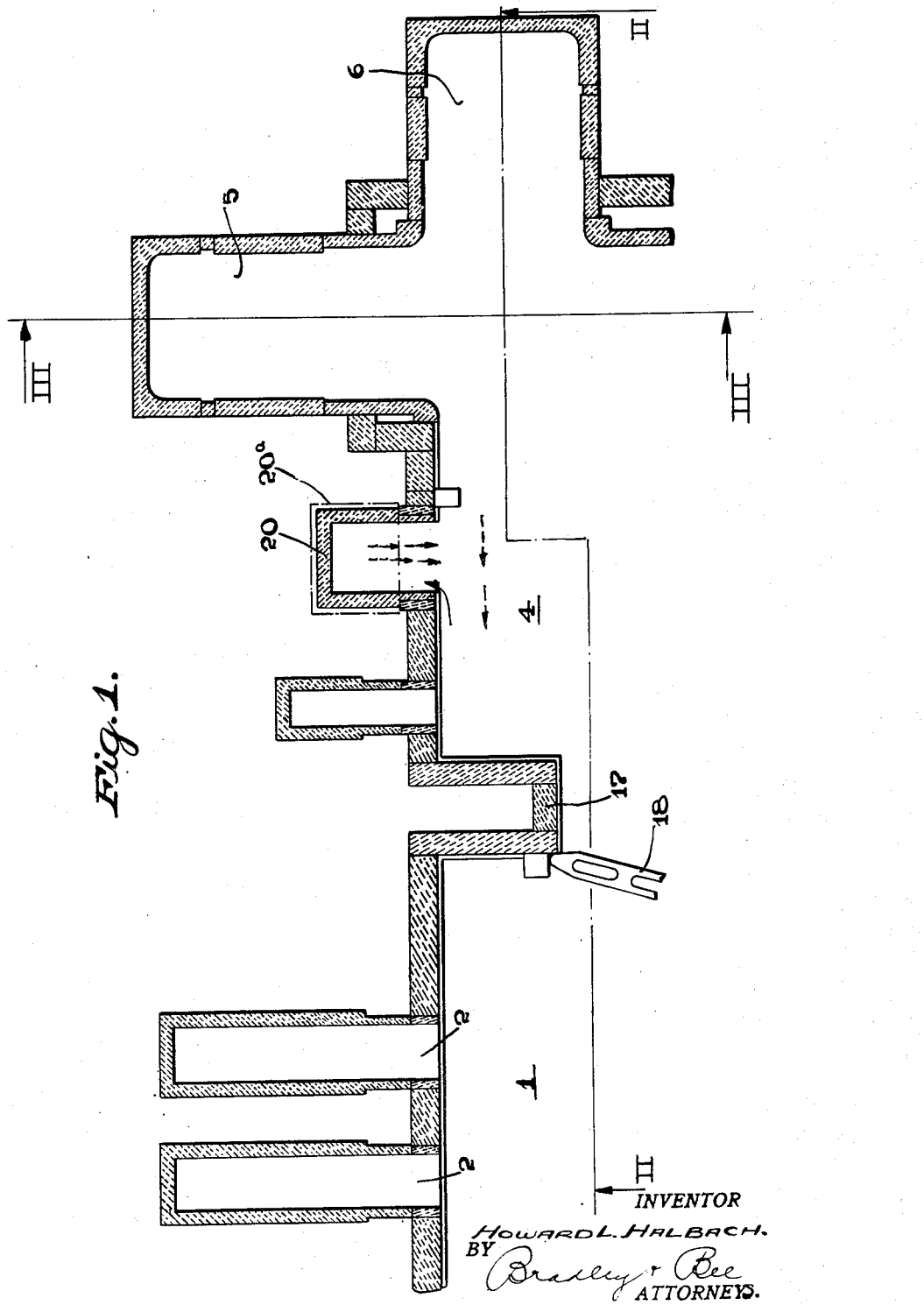

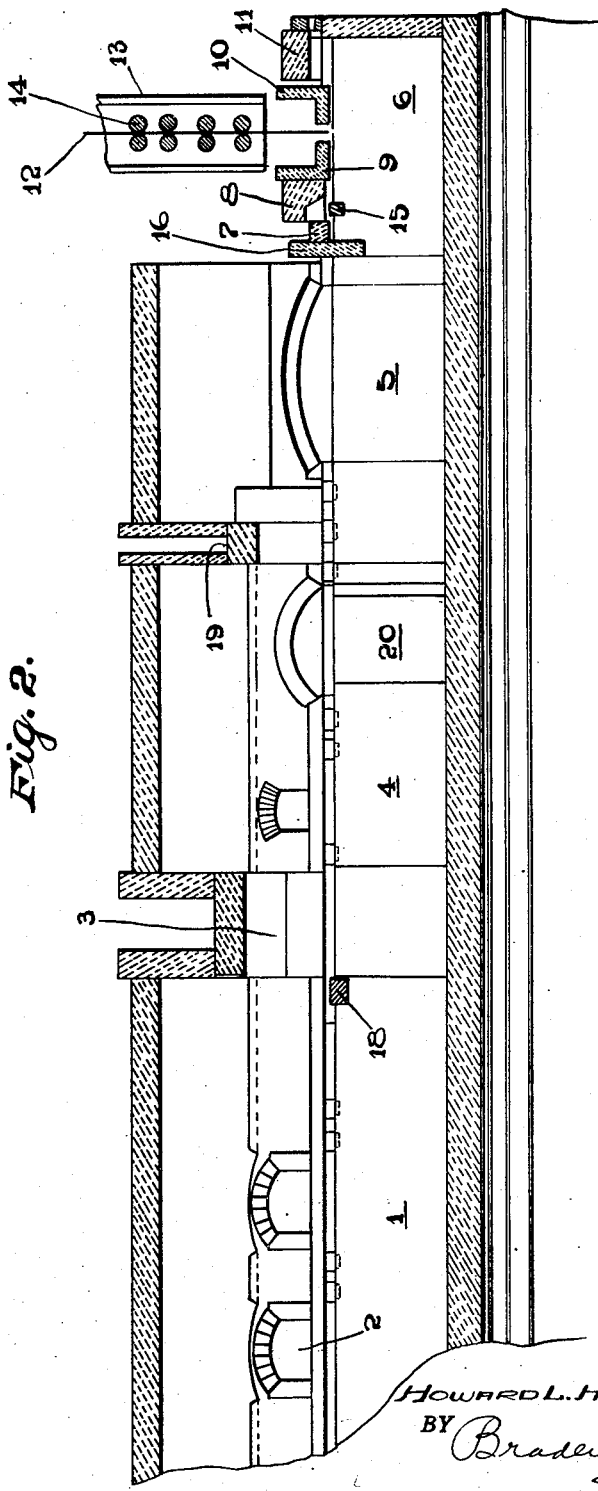

Patented Aug. 13, 1935

2,011,482

UNITED STATES PATENT OFFICE 2,011,482

GLASS TANK

Howard L. Halbach, Clarksburg, W. Va., assignor to Pittsburgh Plate Glass Company, a corporation of Pennsylvania Application November 23, 1933, Serial No. 699,400

4 Claims. (Cl. 49—54)

The invention relates to glass tanks for use in the manufacture of window glass and particularly to the outlet end at which the forehearths or drawing kilns are located. The object of the invention is to provide a construction which will prevent the impurities which lie upon the surface of a body of glass in a melting tank from being carried forward into the drawing kilns and impairing the quality of the glass drawn therefrom. Although floaters or skim bars are provided extending transversely of the tank near its outlet end for this purpose, they are only partially effective, and as a result hand skimming is required from time to time which fails to completely remove the source of trouble and introduces other defects into the glass. I have found that surface impurities, such as stone, particles of refractory from the walls of the tank, and the like, tend to work to the sides of the tank during the flow from the melting end of the tank to its outlet, and that, if bays or recesses are provided in the side walls of the tank just short of the drawing kilns, the impurities will collect in such bays, sink downward through the glass in the bays to a lower level as they become cooled, and will finally be dragged back toward the melting end of the tank by a counterflow of glass which is present in all window glass tanks, at a level beneath the top layer of glass which is moving toward the outlet end of the tank. In this manner, the amount of surface impurities reaching the drawing kilns, is reduced to a minimum, the necessity of hand skimming is practically eliminated, and the product noticeably improved. One embodiment of the invention is illustrated in the accompanying drawings, wherein:

Figure 1 is a horizontal section through one-half of the tank. Fig. 2 is a section on the line II—II of Fig. 1. And Fig. 3 is a transverse section on the line III—III of Fig. 1.

Referring to the drawings, 1 is the melting portion of the tank, a part only of which is shown and which is provided with the usual ports 2, 2 and regenerator apparatus. Forward of the melting end of the tank is a drop arch 3 and in advance of such drop arch is the outlet end 4 of the tank. In the particular construction shown, the outlet end of the tank is provided with four drawing kilns or forehearths 5, 5 and 6, 6, it being understood that the one-half of the furnace which is not shown in Fig. 1, is a duplicate of what is shown in such figure, with a laterally extending kiln in opposition to the kiln 5 and a forwardly extending kiln in parallel with the kiln 6. Each of these kilns is roofed over and provided with suitable sheet drawing apparatus, as shown in Figs. 2 and 3, the apparatus there shown being well known in the art. The roof or cover of the kiln comprises the refractory blocks 7, 8, 9, 10 and 11, the blocks 9 and 10 being L-shaped in cross section and spaced to permit of the drawing of the glass sheet 12 therebetween. The glass sheet is drawn upward from each kiln through a leer 13 by means of pairs of driven rolls 14. Suitable skim bars 15 and 16 are employed in connection with each kiln, the bar 16 also serving as a cut-off to prevent a flow of the gases of combustion above the surface of the glass into the kiln. Just back of the neck 17 (Fig. 1) is the usual skim bar 18. Also located to the rear of the drawing kilns 6, 6 is a drop arch 19 similar to the arch 3 and serving to restrict the flow of gases longitudinally of the outlet end of the tank.

The foregoing structure is all old and the applicant's improvement consists in the addition of the means for eliminating surface impurities heretofore referred to, which improvement is in the form of a pair of bays or recesses 20, 20 which project laterally from the outlet end of the tank just back of the drawing kilns 5, 5. These bays are of the same depth as the tank, as indicated in Fig. 2, and have an entrance opening which may to advantage be about five feet in width, although this may be increased or decreased depending upon conditions or upon the size of the tank. In order to prevent loss by radiation from these bays, they are preferably provided with removable refractory covers 20a, as indicated by the dotted lines in Fig. 1.

In operation, any impurities at the surface of the glass, such as stone, or particles of material, which spall away from the walls of the tank and remain unmelted, tend, in the forward flow of glass from the melting end of the tank to the drawing end, to follow along the side walls of the tank and enter the bays 20, 20. The body of glass in these bays becomes cooled as compared with the body of glass in the tank due to the radiation from the walls of the bays, so that a downward circulation is induced therein, and it has been found that this downward circulation carries with it a large part of the floating particles. This material then works back into the tank at a level well below the surface line of the glass, as indicated by the arrows in dotted lines. This return glass is not carried forwardly toward the drawing kilns, but is carried in the reverse direction, as there is a counterflow of glass in the tank at a level below the top layer of glass. The chilled glass and the particles of unmelted material carried thereby, which pass from the bays into the tank are, therefore, carried to the rear and arrive in the melting end of the tank. Eventually these particles will become melted and disappear. Under these conditions and incident to the use of the bays, very little material in the way of solid particles which would tend to injure sheet glass finds its way into the drawing kilns 5, 5 and 6, 6, so that the quality of the product is materially improved incident to the use of this expedient. Heretofore, it has been necessary to handskim the drawing kilns either back of the bars 15 or the bars 16 (Fig. 3), which skimming tends to materially interfere with the quality of the glass drawn from the kiln, but due to the use of the bays, this skimming has been found to be either entirely eliminated, or required only at very long intervals. Under exceptional circumstances, there may be a collection of solid material in the bays 20, 20, which requires skimming, but in most cases, this is not required, and in any case only at long intervals. There is some heat loss incident to the radiations from the bays 20, 20, but this loss is negligible in comparison with the benefits derived from the elimination of solid particles from the glass which tend to cause breakage during the drawing operation.

What I claim is:

1. In combination in a glass tank having a melting end and an outlet end provided with drawing kilns, means for withdrawing glass sheets continuously from said kilns, and a bay or recess in each of the side walls of the tank back of the drawing kilns, said bays being free of obstruction at the glass level to permit of a free circulation of glass therethrough.

2. In combination in a glass tank having a melting end and an outlet end provided with drawing kilns, extending at right angles from the opposite sides of said outlet end, means for withdrawing glass continuously from said kilns, and a bay or recess in each of the side walls of the tank back of the drawing kilns, said bays being of less extent than the kilns and unobstructed by the clay work at the glass level so that a free circulation of surface glass is permitted through the bays.

3. In combination in a glass tank having a melting end and an outlet end provided with drawing kilns, means for withdrawing glass sheets continuously from said kilns, and a bay or recess in each of the side walls of the tank back of the drawing kilns, said bays being completely covered over and unobstructed by clay work at the glass level so that a free circulation of surface glass is permitted through the bays.

4. In combination in a glass tank having a melting end and an outlet end provided with drawing kilns, means for withdrawing glass sheets continuously from said kilns, and a bay or recess in each of the side walls of the tank back of the drawing kilns, said bays having their interiors free of clay work at the level of the glass being provided with removable covers completely covering the areas of glass in the bays.

HOWARD L. HALBACH.